Dec. 5, 1961  J. E. OLNEY  3,011,797
BOAT TRAILER WITH ADJUSTABLE LOAD RUNNING
GEAR CONNECTION
Filed Jan. 12, 1960
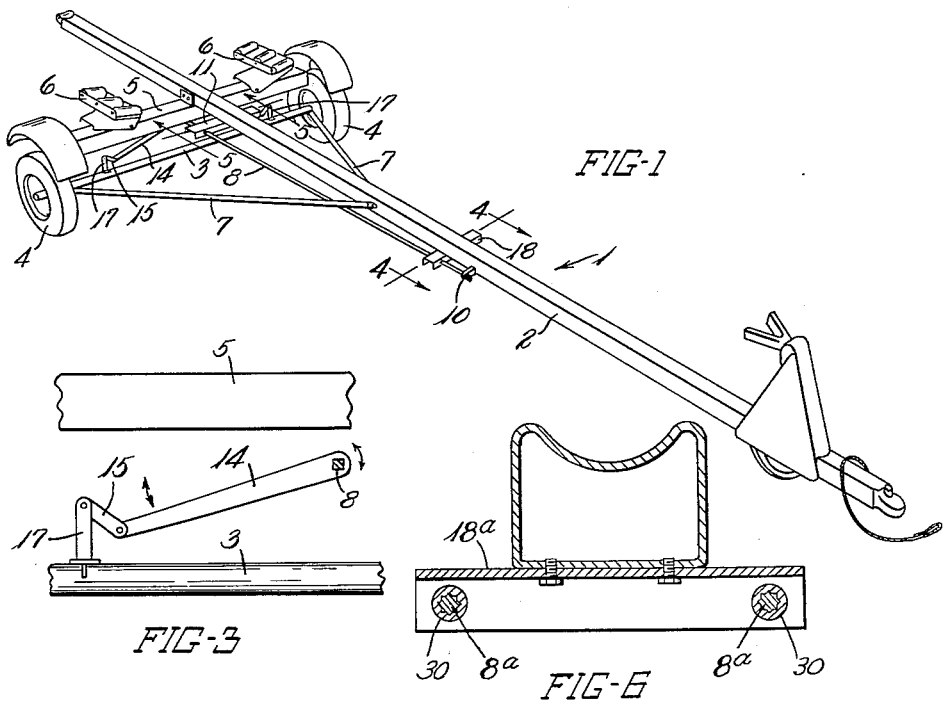
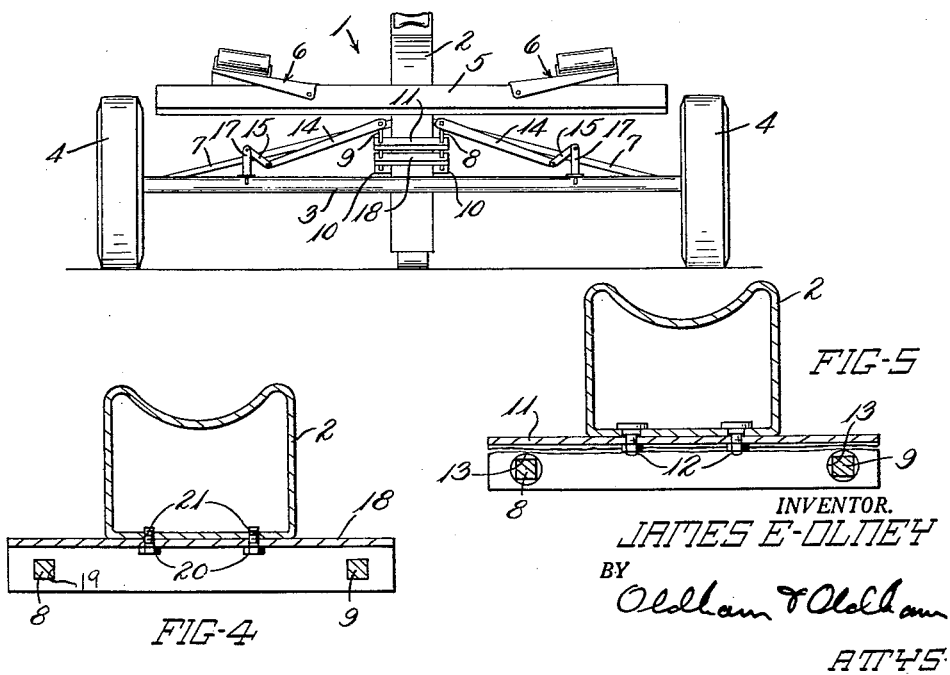
INVENTOR.
JAMES E. OLNEY
BY
Oldham & Oldham
ATTYS.

United States Patent Office 3,011,797
Patented Dec. 5, 1961

3,011,797
BOAT TRAILER WITH ADJUSTABLE LOAD
RUNNING GEAR CONNECTION
James E. Olney, 180 Northview Drive, Canfield, Ohio
Filed Jan. 12, 1960, Ser. No. 1,967
7 Claims. (Cl. 280—124)

The present invention relates to boat trailers, and especially to a novel torsion type suspension for the running gear in a boat trailer.

Heretofore there have been many different types of trailers provided for carrying boats and other loads, but particular problems exist in boat trailers that are not found to the same degree in other types of trailer constructions. In boat trailers, the type and size of a boat and motor to be carried on a boat trailer may vary widely at different times. Furthermore, some people place relatively large amounts of miscellaneous gear and articles in a boat when it is being towed in an upright position on a boat trailer. Such loads positioned in the boat while on a trailer obviously will vary widely from time to time so that the total load placed on the trailer will be quite different in total amount under different operating conditions. It obviously is quite desirable to maintain the running gear of the boat trailer in the best operative condition to provide a smooth ride for the boat trailer and load carried thereon at all times, and to have the load balanced for easy handling of the loaded trailer when the trailer is manually moved. However, with such changeable load conditions, it has been very difficult heretofore to provide any type of a permanent, completely satisfactory load suspension means in the trailer.

The general object of the present invention is to provide a novel and improved type of a boat trailer characterized by the adjustable, resilient load carrying means and connection members provided between the frame means of the trailer and the wheel support portion of the trailer.

Another object of the invention is to provide a torsion bar type of an adjustable load support connecting the wheels and axle means in the running gear of the trailer to the remainder of the trailer.

A further object of the invention is to provide relatively uncomplicated, sturdy means for varying the load support action and characteristics in a boat trailer.

Yet another object of the invention is to provide a pair of torsion bars extending longitudinally of the boat trailer and to provide a longitudinally adjustable support or retainer member engaging these torsion bars to control the effective length of the torsion bars available for load support action by twisting moments set up in the torsion bars.

The foregoing and other objects and advantages of the invention will be made more apparent as the specification proceeds.

For a better understanding of the present invention, reference should be had to the accompanying drawings wherein a boat trailer embodying the principles of the invention is shown, and wherein:

FIG. 1 is a perspective view of the boat trailer of the invention;

FIG. 2 is an enlarged elevation from the back end of the trailer of FIG. 1 when the front end of the trailer is supported upon the ground or other support surface;

FIG. 3 is a slightly enlarged, fragmentary elevation of a portion of the mechanism connecting the running gear to the remainder of the trailer;

FIGS. 4 and 5 are enlarged fragmentary vertical sections taken on lines 4—4 and 5—5 of FIG. 1; and FIG. 6 is a fragmentary vertical section, like FIG. 4, of a modified construction.

When referring to corresponding members shown in the drawings and referred to in the specification, corresponding numerals are used to facilitate comparison therebetween.

In general, the present invention relates to a boat trailer comprising a center frame pole means, a running gear unit including an axle operatively secured to the center frame pole means, a pair of torsion bars secured at their forward ends to the center frame pole means and extending rearwardly to such means parallel thereto, means secured to the center pole means and retaining the torsion bars in a fixed axial position but permitting arcuate movement thereof, link means secured to and extending between the axle and each of the torsion bars adjacent the rear end thereof to connect the axle and torsion bars but to permit relative movement between the axle and the center frame pole means, and means engageable with the center frame pole means at longitudinally spaced portions thereof and engaging each of the torsion bars intermediate the end thereof for securing the torsion bars against arcuate movement at such point so that varying lengths of the torsion bars can be provided for torsional support of the axle through the link means to vary the load supporting characteristics of the trailer when such last named means are adjusted longitudinally of the center frame pole means.

In the drawings, a boat trailer 1 is shown and it includes any desired conventional type of a center frame pole means 2, for example, including a turnpole frame, an A frame, or a center frame pole or member. A substantially conventional running gear unit, including an axle 3 supporting wheels 4 thereon, is secured to the center frame pole means 2, as by means of an upper cross bar 5 that connects to the axle 3 through means described hereinafter in detail.

Any desired boat support, or boat engaging means 6 may be carried by the cross bar 5 and/or by any desired portion of the center frame pole means 2. Tie rods 7 also connect to the axle 3 and extend forwardly and laterally inwardly of the boat trailer to be secured to the center frame pole means 2 adjacent the front ends of the tie bars 7.

As an important feature of the present invention, special adjustable support means are provided for connecting the axle 3 to the remainder of the boat trailer 1. Specifically, such additional means include a pair of torsion bars 8 and 9 that are parallel to each other and to the center axis of the center frame pole means 2 but with the torsion bars 8 and 9 normally being below and adjacent the lateral margins of the center frame pole means. These torsion bars are shown secured to the center frame pole means by a member, or members, such as brackets 10, or other conventional support members suitably secured to the center frame pole means. The brackets 10 engage the torsion bars 8 and 9 at their front ends to hold them against any arcuate movement and to fix them in a desired position in the trailer. The torsion bars 8 and 9 engage a member, such as a channel 11, that is secured to the center frame pole means 2, as by means of bolts 12 intermediate the ends of the torsion bars. In this embodiment of the invention, the torsion bars 8 and 9 are shown as being square in section, and the channel 11 is provided with pairs of axially aligned round holes 13 in the legs or flanges thereof on opposite sides of the center frame pole means 2 so that the torsion bars 8 and 9 can be and are received in and extend through these holes 11. FIG. 5 of the drawings best shows that preferably the torsion bars have a diagonal width substantialy equal to but slightly smaller than the diameters of the holes 13 so that the torsion bars 8 and 9 will be firmly supported by the channel 11 against vertical movement but with the torsion bars being movable arcuately with relation to such channel, or other support means.

The torsion bars 8 and 9 are secured to the axle 3 by means of connector arms 14, one of which is fixedly secured to each of the torsion bars 8 and extends substantially radially therefrom. A suitable link, or shackle 15 is pivotally secured to the free end of each of the control arms 14 and in turn pivotally connects to a suitable support stand, or bracket 17 fixedly secured to the axle 3 adjacent the laterally outer portion thereof. It will be seen that the arms 14 and links 15 provide lateral adjustment in their combined effective lengths upon vertical movement of the axle 3 with relation to the center frame pole means 2.

In order to provide adjustability in the support action of the torsion bars 8 and 9, a longitudinally adjustably positioned control, or fulcrum member 18 engages the torsion bars 8 and 9 intermediate the ends thereof. The control member 18, in this instance, comprises a channel having apertures 19 in the legs or flanges thereof shaped complementary to the contour of the torsion bars 8 and 9 and only slightly larger than such torsion bars for snugly receiving the torsion bars therein. The control member 18 is secured to the center frame pole means 2 in a removable, or adjustable manner, such as by means of cap screws 20. These cap screws 20 engage the center frame pole means 2 at any of several longitudinally spaced positions, as by engaging any of a series of tapped apertures 21 spaced longitudinally of the center frame pole means. The bolts extend through the control member 18 and are available on the lower side thereof for tightening and adjustment action to secure the control member 18 in a given position on the center frame pole means 2. Preferably such control member 18 extends transversely of the center frame pole means and is on the lower surface thereof. Thus with longitudinal movement of the control member 18 along the center frame pole means, a varying effective length is provided in each of the torsion bars 8 and 9 for load support action by torsional movement of the bar so that varying strength load support characteristics and action are provided in the trailer 1.

It will be recognized that any suitable type of bolt, cap screw or lock means can extend through the members 11 and 18 to secure them to the center frame pole means at longitudinally spaced portions thereof by providing tapped apertures, slots, or the like therein, as desired. It also should be noted that the torsion bars 8 and 9 can be made of any desired peripheral shape, except cylindrical, and the torsion bars could be triangular, or hexagonal, or semi-cylindrical in section. Then the apertures provided in the control member 18 are shaped complementary to the torsion bars for engaging them and holding them against any rotation. Likewise the apertures provided in the positioning channel 11 are of suitable size for receiving the torsion bars 8 and 9 and holding them in a given axial position but permitting arcuate movement of such bars as the running gear unit and particularly the axle 3 portion thereof moves over an irregular surface. The control member 18 may, as an alternative construction, be clamped to the center frame pole means 2 for adjustment longitudinally thereof. Several channels or members like the member 11 may be provided at different portions of the torsion bars, if desired, to retain the torsion bars parallel to the center frame pole.

FIG. 1 shows that the positioning channel 11 may be at or adjacent the rear ends of the torsion bars 8 and 9 for support action therefor.

As indicated, the position of the control or positioning member or channel 18 can be universally adjustable along the center frame pole means to regulate the effective torsion length of the torsion bars and the support action provided thereby.

Should it be desirable to use torsion bars of circular or cylindrical shape in section, such as a torsion bar 8a of FIG. 6, then some connector member, such as a collar 30, would be carried on the torsion bars, as by a splined connection, to secure them to members, such as a control member 18a to prevent arcuate movement of the torsion bars. The collar 30 is fixedly secured to the control member 18a.

From the foregoing, it will be seen that the trailer structure of the present invention provides a sturdy boat trailer construction where the load support characteristics can be readily varied for different load, or operating conditions in the trailer. Thus it is belived that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. In a boat trailer or the like, a center frame pole means, a running gear unit including an axle, means securing said running gear unit to said frame pole means, a pair of torsion bars of other than circular shape in cross section secured at their forward ends to said center frame pole means and extending parallel to such center frame pole means, means secured to said center pole means and positioning said torsion bars for arcuate movement only adjacent the rear ends thereof, link means secured to and extending between said axle and each of said torsion bars at the rear ends thereof to permit relative movement between said axle and said center frame pole means, and means engageable with said center frame pole means at different longitudinally spaced portions thereof and engaging each of said torsion bars intermediate the ends thereof to secure said torsion bars against arcuate movement at such last-named means whereby varying lengths of said torsion bars can be provided to engage said link means for torsional support of said axle to vary the load carrying characteristics of the trailer.

2. In a boat trailer or the like, a center frame pole means, a running gear unit including an axle, means securing said running gear unit to said frame pole means, a pair of torsion bars fixedly secured at their forward ends to said center frame pole means and extending parallel to such center frame pole means, means operatively secured to said center pole means and positioning said torsion bars adjacent the rear ends thereof, said last-named means engaging said torsion bars to permit arcuate movement thereof only centered on the longitudinal axis of such torsion bars, link means secured to and extending between each of said torsion bars at the rear ends thereof and said axle to permit relative movement between said axle and said center frame pole means, and fulcrum means engageable with said center frame pole means at any of several longitudinally spaced portions thereof and engaging each of said torsion bars intermediate the ends thereof to secure said torsion bars against arcuate movement at such fulcrum means whereby varying lengths of said torsion bars can be provided to engage said link means for torsional support of said axle to vary the load carrying characteristics of the trailer.

3. In a boat trailer or the like, a center frame pole means, a running gear unit including an axle, means securing said running gear unit to said frame pole means, a pair of torsion bars secured adjacent their forward ends to said center frame pole means and extending parallel to such center frame pole means, means operatively carried by said center pole means and positioning said torsion bars for arcuate movement adjacent the rear ends thereof, means secured to and extending between each of said torsion bars and said axle to permit relative movement between said axle and said center frame pole means by twisting said torsion bars, a control member, and means engageable with said control member and said center frame pole means at different longitudinal portions thereof to secure said control member thereto, said control member engaging at least one of said torsion bars intermediate the ends thereof to secure such torsion bar against any arcuate movement whereby varying lengths of said torsion bars can be provided to be secured to said axle for torsional load support action to vary the load carrying characteristics of the trailer.

4. A trailer as in claim 1 where said last-named means include a member having a hole therein shaped complementary to the sectional shape of said torsion bars and receiving said torsion bars therein to secure them against arcuate movement, and bolt means securing said member to said center frame pole means at a selected place thereon.

5. In a boat trailer or the like having a center frame pole means, a running gear unit including an axle, and means securing said running gear unit to said frame pole means, the improvement comprising a pair of torsion bars of other than circular shape in cross section secured at their forward ends to said center frame pole means and extending parallel to such center frame pole means, means secured to said center pole means and positioning said torsion bars for arcuate movement only adjacent the rear ends thereof, link means secured to and extending between said axle and each of said torsion bars at the rear ends thereof to permit relative movement between said axle and said center frame pole means, and means engageable with said center frame pole means at longitudinally adjustable portions thereof and engaging each of said torsion bars intermediate the ends thereof to secure said torsion bars against arcuate movement at such means, said last-named means including a member with apertures therein complementary to said torsion bars to engage them and hold said torsion bars against twisting at said member.

6. In a boat trailer or the like, a center frame pole means, a running gear unit including an axle, means securing said running gear unit to said frame pole means, a pair of torsion bars of other than circular shape in cross section secured adjacent ends thereof to said center frame pole means and extending parallel to such center frame pole means, means secured to said center pole means and positioning said torsion bars for arcuate movement only adjacent the other ends thereof, link means secured to and extending between said axle and each of said torsion bars at the said other ends thereof to permit relative movement between said axle and said center frame pole means, and fulcrum means engaging said center frame pole means and each of said torsion bars intermediate the ends thereof to secure said torsion bars against arcuate movement at such fulcrum means, said fulcrum means being longitudinally adjustable on said center frame pole means whereby varying lengths of said torsion bars can be provided to engage said link means for torsional support of said axle to vary the load carrying characteristics of the trailer.

7. In a boat trailer or the like, a center frame pole means, a running gear unit including an axle, means securing said running gear unit to said frame pole means, a pair of torsion bars secured adjacent corresponding ends thereof to said center frame pole means and extending parallel to such center frame pole means, means operatively carried by said center pole means and positioning said torsion bars for arcuate movement adjacent the other ends thereof, means secured to and extending between each of said torsion bars and said axle to permit relative movement between said axle and said center frame pole means by twisting said torsion bars, a control member, and means engageable with said control member and said center frame pole means to secure said control member thereto in a longitudinally adjustable connection, said control member engaging at least one of said torsion bars intermediate the ends thereof to secure such torsion bar against any arcuate movement whereby varying lengths of said torsion bars can be provided to be secured to said axle for torsional load support action to vary the load carrying characteristics of the trailer.

References Cited in the file of this patent

UNITED STATES PATENTS

| | | |
|---|---|---|
| 1,439,005 | Kyle | Dec. 19, 1922 |
| 2,163,131 | Porsche | June 20, 1939 |
| 2,691,534 | Sampsell | Oct. 12, 1954 |
| 2,889,945 | Holsclaw | June 9, 1959 |